United States Patent

[11] 3,578,950

[72] Inventor Clyde C. Moratz
 Brookfield, Wis.
[21] Appl. No. 839,511
[22] Filed July 7, 1969
[45] Patented May 18, 1971
[73] Assignee Controls Company of America
 Melrose Park, Ill.

[54] ELECTRIC HEAT SEQUENCE CONTROL
 6 Claims, 6 Drawing Figs.
[52] U.S. Cl. .................................................. 219/486
[51] Int. Cl. .................................................. H05b 3/00
[50] Field of Search .......................................... 219/486,
 485; 337/305, 311, 340; 335/72, 73; 236/9;
 200/38 (B), 38(B1)

[56] References Cited
 UNITED STATES PATENTS
2,700,505 1/1955 Jackson ..................... 236/9(A)
2,963,628 12/1960 Ostland ..................... 200/38(B1)
2,993,106 7/1961 Maudlin et al. ............. 219/486
3,161,758 12/1964 Biermann et al. ........... 219/486(X)

Primary Examiner—Harold Broome
Attorneys—John W. Michael, Gerrit D. Foster, Bayard H. Michael, Paul R. Puerner, Joseph A. Gemignani, Andrew O. Riteris, Daniel Van Dyke and Spencer B. Michael ABSTRACT: When the thermostat calls for heat the motor starts and rotates the cam bank to start the fan first and then place the heaters on the line in sequence. After all heaters are on the line the motor circuit is transferred to control by the cold contact of the SPDT thermostat so the motor will stop and keep all heaters on the line until the thermostat is satisfied at which time the heaters are taken off the line in sequence. Once the sequence starts it must be completed notwithstanding changes in the thermostat condition. The only exception is limit switch opening or power failure causing deenergization of the solenoid allowing the spring biased lever to open all heater circuits and require homing the control at its starting point before heaters can be put back on the line.

Patented May 18, 1971

Inventor
Clyde C. Moratz
By Bayard Michael
Attorney

Patented May 18, 1971

Inventor
Clyde C. Moratz
By Bayard Michael
Attorney

ELECTRIC HEAT SEQUENCE CONTROL

BACKGROUND OF INVENTION

In the electric heating field it is generally preferable that the resistive heaters be placed on the power line in sequence rather than being placed on the line all at once. This not only reduces the capacity requirements of the switches involved but it also overcomes the problem of flickering lights found when a substantial load is placed on the line abruptly. The general problem of placing the electric heaters on the line is easily solved with various sequencing controls but heretofore these controls have been rather costly and, therefore objectionable, at least in installations compatible with low priced housing. For example, many of the prior art devices were capable of placing heaters on the line in sequence but they were designed so that they required the use of costly precision switches and, furthermore, in an effort to become what one might consider ideal controls, were so constructed as to reverse the sequencing action at whatever point in the program the thermostat was satisfied. Therefore, if three of five heaters had been placed on the line and at that time the thermostat were satisfied the program would immediately reverse and sequence the three heaters off the line. Some of the prior art controls had difficulties with respect to power failures and the like in that resumption of power would place all of the heaters previously placed on the line back on the line immediately and the very condition sought to be overcome in the normal operation occurred in the abnormal operation.

SUMMARY OF INVENTION

With the foregoing comments in mind, the present control has been designed to greatly reduce the cost of the control while insuring that the heaters are never placed on the line simultaneously and doing all this with the slight penalty that cone the sequence is initiated it must be completed, that is if three of five heaters have been placed on the line and the thermostat is satisfied the program must continue until all five have been placed on the line, at which time they will be sequenced off the line. Similarly, if the heaters are in the process of being sequenced off the line and the thermostat calls for heat the sequence must continue until all the heaters are off the line. In this way I am able to utilize a control driving a programmer or cam bank through a predetermined sequence under all conditions and avoid the need for reverse mechanism, clutches, or the like.

DESCRIPTION OF PREFERRED EMBODIMENT

Figures 1, 2, 3:
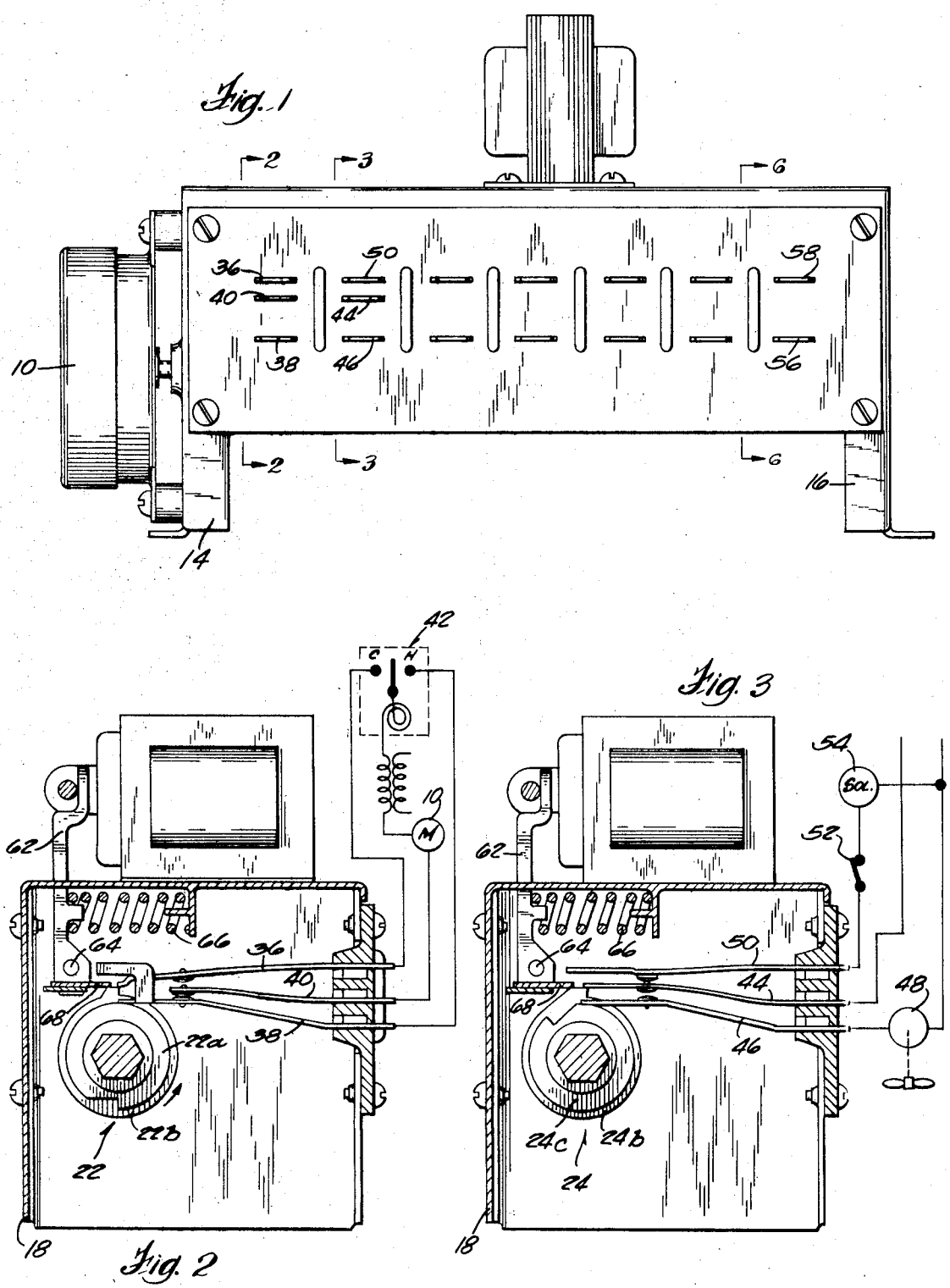
FIG. 1 is a side elevation of the complete control.
FIG. 2 is a section taken on line 2—2 in FIG. 1.
FIG. 3 is a section taken on line 3—3 in FIG. 1.
Figure 4:
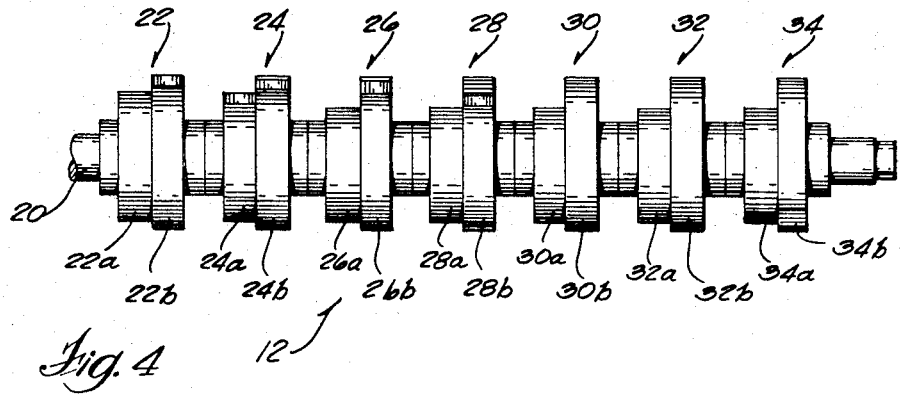
FIG. 4 shows the cam bank per se.
Figure 5:
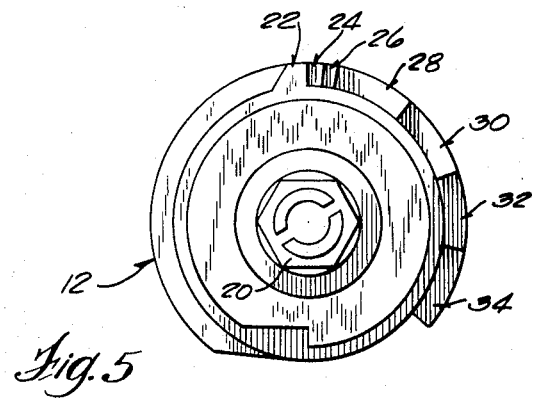
FIG. 5 is a semischematic representation showing the angular disposition of various of the cams of the cam bank.

The control comprises an electric motor 10 driving the cam bank generally denoted 12 mounted between the end plates 14, 16 and enclosed in the housing 18. The motor drives a shaft 20 running through the various cams on the cam bank 12. These cams include a control stage cam 22, a fan stage cam 24, and the five heat stage cams 26, 28, 30, 32, 34. As can be seen in FIG. 5, the cams are angularly offset so as to achieve a sequencing action, which will be explained more fully hereinafter.

These are two cams in each cam assembly. Cam assembly 22 includes cams 22a and 22b. The upper switch blade 36 follows cam 22b while the lower switch blade 38 follows the smaller cam 22a with the rigid blade 40 positioned between the two other blades. These blades are wired into the thermostat circuit to control the synchronous motor 10. Thermostat 42 is of the SPDT type having cold and hot contacts respectively designated C and H and the bimetal snaps between these two positions. The bimetal is in the secondary of a step down transformer for low voltage operation. The synchronous motor 10 is in circuit with the bimetal. The cold contact C is connected to the upper blade 36 while the hot contact H is connected to the lower blade 38. In the position shown in the drawing, the smaller cam 22a is holding blade 38 in contact with blade 40. Therefore, when the thermostat bimetal connects with contact H the synchronous motor 10 will be energized. This will start the cams rotating in a counterclockwise direction and this will immediately occasion the upper blade dropping off the hump on cam 22b to contact rigid blade 40. At this point even if the thermostat switches to the cold contact the motor 10 will remain energized for approximately 180° of revolution of the cams 22, at which point the lower blade will drop away from the rigid middle blade 40 and if the thermostat is still on the hot contact the circuit through the motor will be interrupted and the motor will stop. If the thermostat is on the cold contact the motor will be energized through blades 40 and 36 to continue rotation until such time as the hump on cam 22b lifts blade 36 from the rigid blade to break the circuit to the motor.

Now referring to the cam assembly 24, it will be noted that the middle blade 44 follows cam 24b while the lower blade 46 follows cam 24a. These blades 44, 46 are connected to the line $L_{1, l2}$ with the fan motor 48 in series with the lower blade 46. The upper blade 50, in normal operation, always follows blade 44 and is in series with the normally closed limit switch 52 and the coil of the solenoid 54, which is connected to $L_2$. Therefore, as soon as the motor starts turning the cam bank 12 blade 44 will drop off the hump on cam 24b and close on blade 46. This will turn on fan 48. Since blade 50 rests on blade 44 there is a complete circuit from $L_1$ through the normally closed limit switch 52 and solenoid 54. The purpose of the solenoid will be discussed hereinafter.

Figure 6:
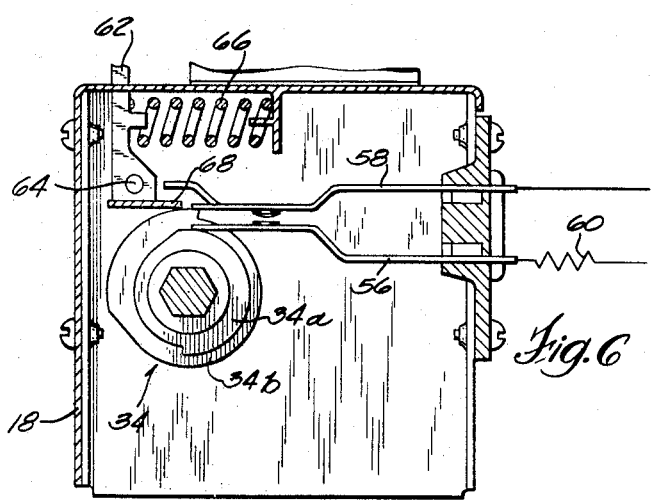
FIG. 6 is a simplified showing of one of the heater cam and switch arrangements.

Cam 24b is mounted on the shaft so that in the first 5° of rotation of the cam shaft the fan is energized. In 10° of rotation the first heat stage will be energized and this can be seen with reference to the sample heat stage cam shown in FIG. 6 representing cam subassembly 34. Here the lower blade 56 follows 34a while the upper blade 58 follows 34b. After 10° of rotation the upper blade 58 drops off the high portion of 34b and engages the lower blade 56 whereupon the associated heater 60 is placed across the line and will remain so for 180° of rotation. As can be seen from FIG. 5, the second stage comes on in 40°, the third in 70°, the fourth in 100°, and the fifth in 130°. The turn off or contact opening drop on the associated smaller cam of each of the heater cam assemblies 26, 28, 30, 32, 34 will in all cases be about 180° away from the point at which the switches close. This assures the same sequence going off the line as coming on the line. In the case of cam 34 it is cam 34a which opens the heater circuit.

As indicated above, the solenoid is energized as soon as the thermostat calls for heat. This pulls the solenoid into the illustrated position and rotates the lever 62 about its pivot 64 in a clockwise direction against the bias of spring 66. Anytime the solenoid is deenergized, the spring will move the lever 62 in a counterclockwise direction around its pivot 64. The lever 62 carries an insulated auxiliary shutoff lever 68 which underlies certain of the switches as will now be described. The purpose of this is so that upon opening of the normally closed limit switch 52 or on a momentary power failure the heaters will be taken off the line. This is done as follows. On the fan stage cam assembly 24 the auxiliary lever 68 underlies the upper blade 50 so that upon deenergization of the solenoid blade 50 is mechanically separated from the middle blade 44 which it normally follows in all operations. However, upon mechanical separation of these two blades, reclosure of the limit switch or resupply of power to the line will be unable to energize the solenoid and, therefore, the switches, which are opened mechanically upon deenergization of the solenoid, will remain open until such time as the hump or rise on 24b is rotated under the middle blade to lift it into contact with upper blade 50.

On each of the heat stages the auxiliary lever 68 underlies the end of the upper blade so that upon deenergization of the solenoid the blades controlling the associated heater are opened and these have to stay open now until the solenoid can be reenergized.

Considering the control stage, it will be noted that the lower blade 38 has an extension 70 overlying the auxiliary lever 68 so that upon deenergization of the solenoid the lower blade will be lifted up so as to stack the three blades 36, 38, 40. This insures that the circuit to sequencer motor 10 will be completed upon reestablishment of the power if there had been a failure or, if the limit switch is operated the motor will in any event be operated to drive the cam bank back to zero (its shutoff point). During this sequence, of course, the fan switch blades 44, 46 will be opened prior to reaching the shutoff point and just prior to reaching the shutoff point the solenoid-limit switch blades 44, 50 will be placed in position to be in contact upon reenergization of the solenoid. Finally the upper blade 36 is lifted away from the rigid middle blade 40. If the thermostat is in the cold position the synchronous motor will be deenergized If the thermostat is in the hot position the motor will be energized and if the limit switch is open the solenoid cannot be energized and, therefore, all the heater switches are held in a position preventing energization of the heaters and the fan. In operation of this control the solenoid is constantly energized except upon operations (opening) of the limit switch.

By using a unidirectional rotary cam bank I have avoided use of reverse mechanisms and can use simple switches The simplicity of the design carries the penalty of having to complete the cycle once it has been initiated but with only 2 minutes required for the entire 360° rotation there is no serious overheating of the space.

I claim:

1. A sequence control for electric heating comprising,
   a cam bank,
   a motor driving the cam bank,
   a thermostat controlling the motor,
   a plurality of heater switches controlled by cams on the cam bank to be closed in sequence as the cam bank is rotated,
   means for normally interrupting the rotation of the cam bank only after all the heater switches are closed and then only if the thermostat still calls for heat,
   the motor driving the cam bank upon satisfaction of the thermostat to open the heater switches in sequence and to interrupt the power supply to the motor after all the heater switches have been opened.

2. A control according to claim 1 in which the interrupting means comprises a switch operated by the cam bank and connected to the motor and the room thermostat to transfer from the call-for-heat circuit to the heat-satisfied circuit of the thermostat after all the heater switches are closed whereby the motor operation is not resumed until the thermostat is satisfied.

3. A control according to claim 1 including means responsive to an abnormal condition to open all said switches and keep them open until the condition has been corrected and the cam bank has been returned to the position in which all the switches would be opened by the cam bank.

4. A control according to claim 3 in which the means responsive to an abnormal condition includes a solenoid in circuit with a limit switch,
   a lever actuated by the solenoid and engaging the heater switches upon deenergization of the solenoid in response to opening the limit switch or to power failure,
   a spring biasing the lever in the switch opening direction.

5. A control according to claim 4 in which the lever operates on the cam operated motor control switch to insure supply of power to the motor upon correction of the abnormal condition without regard for the operating state of the thermostat.

6. A control according to claim 5 including a fan switch operated by the cam bank to be closed first and opened last in any sequence.